United States Patent [19]

Andrei et al.

[11] Patent Number: 5,417,870
[45] Date of Patent: May 23, 1995

[54] SOLID, POLYETHER-BASES POLYMERIC ELECTROLYTE

[75] Inventors: Maria Andrei, Berceto; Arnaldo Roggero, San Donato Milanese; Massimo Soprani, Borgosesia, all of Italy

[73] Assignee: Eniricerche S.p.A., Milan, Italy

[21] Appl. No.: 194,561

[22] Filed: Feb. 10, 1994

[30] Foreign Application Priority Data

Feb. 11, 1993 [IT] Italy ............... MI93A0233

[51] Int. Cl.⁶ ............................... H01G 9/025
[52] U.S. Cl. ......................... 252/62.2; 429/192
[58] Field of Search ............... 252/62.2; 429/192

[56] References Cited

U.S. PATENT DOCUMENTS

| | | | |
|---|---|---|---|
| 4,886,716 | 12/1989 | Roggero et al. | 429/192 |
| 4,908,283 | 3/1990 | Takahashi et al. | |
| 5,019,467 | 5/1991 | Fujiwara | |
| 5,064,548 | 11/1991 | Roggero et al. | 429/192 |
| 5,173,205 | 12/1992 | Marchese et al. | 429/192 |
| 5,187,032 | 2/1993 | Sasaki et al. | 252/62.2 |
| 5,194,490 | 3/1993 | Suga et al. | 429/192 |
| 5,240,791 | 8/1993 | Izuti et al. | 252/62.2 |
| 5,264,307 | 11/1993 | Andrei et al. | 429/192 |
| 5,275,750 | 1/1994 | Sato et al. | 429/192 |
| 5,326,657 | 7/1994 | Suga et al. | 429/192 |

FOREIGN PATENT DOCUMENTS 0446793 9/1991 European Pat. Off. .

OTHER PUBLICATIONS

Database WPI, Week 9142, Derwent Publications Ltd., London, GB; AN 91-306963 Sep. 6, 1991.

*Primary Examiner*—Prince Willis, Jr.
*Assistant Examiner*—Alan D. Diamond
*Attorney, Agent, or Firm*—Rogers & Wells

[57] ABSTRACT

The instant invention provides a solid, polymeric electrolyte in membrane form, constituted by a solid solution of an ionic compound in a crosslinked polyether, characterized in that said polymeric electrolyte is obtained by (1) blending a prepolymer, an ionic compound, a plasticizer, and a free-radical-generating activator; and (2) applying the resulting blend on an inert carrier and exposing said blend to a source of ultraviolet light, thermal radiation or electron beam, until the blend is completely crosslinked. The instant invention also provides an electrolyte separator for use in electrochemical devices, optical and electrochemical displays and sensors, which comprises the polymeric electrolyte of the instant invention.

14 Claims, 2 Drawing Sheets

SOLID, POLYETHER-BASES POLYMERIC ELECTROLYTE

The present invention relates to a solid, polyether-based, polymeric electrolyte, to a process for preparing it, and to its use in electrochemical devices.

In the art solid polymeric electrolytes, also referred to as "ionic conductive polymers" are known, which are constituted by a solution of a ionic compound totally dissolved in a plastic, solid, macromolecular material, which is the polymerization product of monomers containing least one heteroatom, in particular oxygen.

Generally, said macromolecular material is polyethylene oxide (PEO), or other polyethers disclosed in U.S. Pat. No. 4,471,037; French patents 2,523,769 and 2,568,574; EP-13,037 and EP-13,199.

The problems associated with such solid, polymeric electrolytes generally consist in their displaying a satisfactory ionic conductivity only at higher-than-room temperatures and in the poor characteristics of mechanical strength and dimensional stability of the corresponding electrolitic membranes. All the above makes the solid polymeric electrolyte known from the prior art not really interesting for a practical use.

Solid, polymeric, polyvinylether-based electrolytes, characterized by good mechanical strength and satisfactory ionic conductivity at low temperatures, are disclosed in U.S. Pat. No. 4,886,716; and in Italian patent No. 22,482 A/90.

Unfortunately, the preparation of said electrolytes requires complex, multistep processes which comprise copolymerizing suitable vinyl ethers at temperatures of from −75° C. to −80° C., during a time period of 30–60 minutes, dissolving the resulting solid, crosslinked polyvinylether in a suitable solvent, mixing the resulting solution with a solution containing an ionic compound, and finally evaporating off the solvent, in order to obtain a membrane.

Recently, solid, polyether-based polymeric electrolytes, displaying good characteristics of mechanical strength and ionic conductivity have been disclosed in Italian patent application No. 1008 A/92.

The preparation of said solid, polymeric electrolytes, which is based on the use of macromers having a controlled molecular weight (which, hence, contain a known number of side ethylene oxide based chains) and a methacrylic group at each chain terminal end, in the crosslinking step requires, however, using a suitable difunctional comonomer in order to obtain dimensionally stable crosslinked systems capable of keeping embedded, inside their interior, an active plasticizer.

Figure 1:
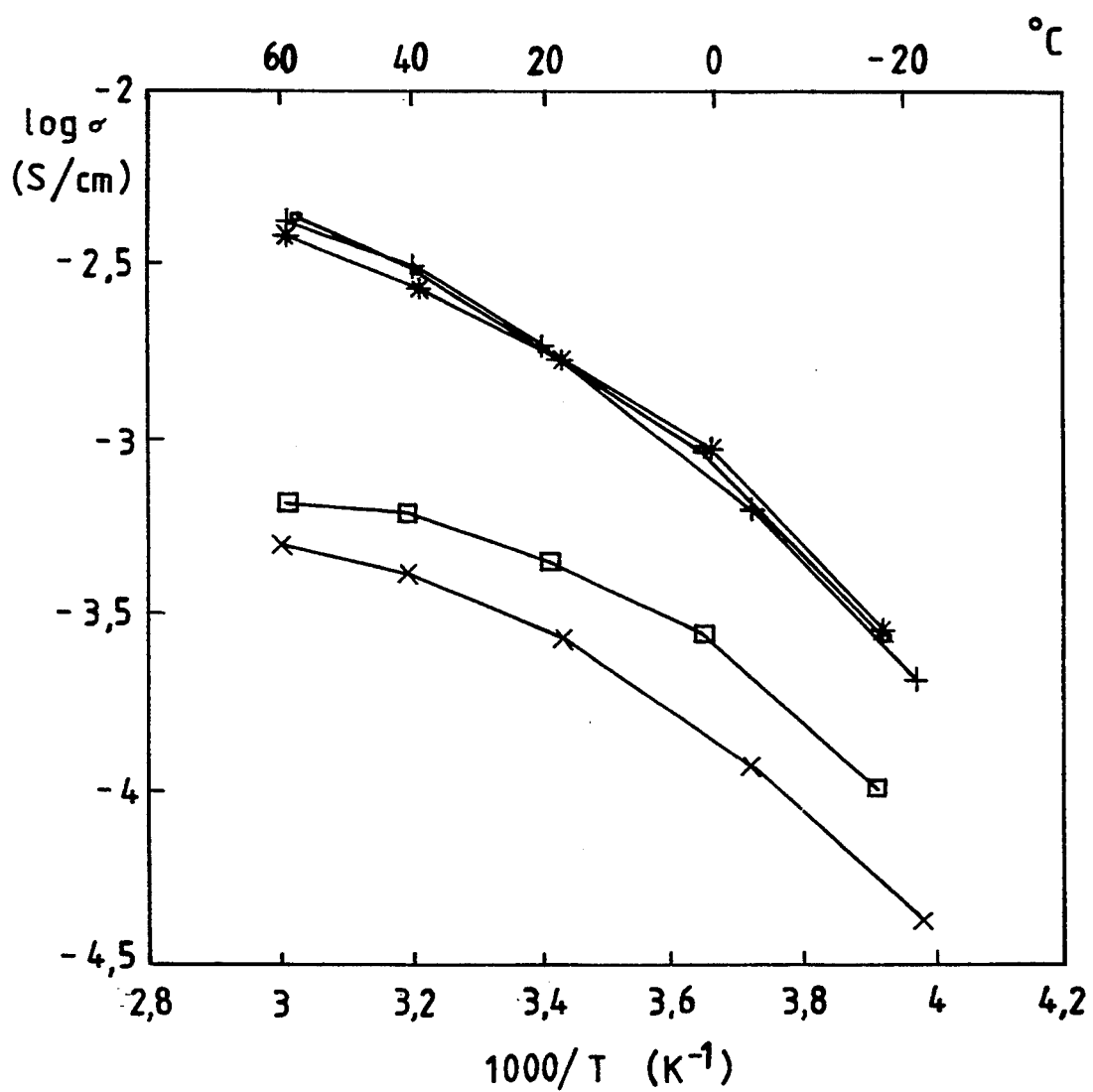
FIG. 1 shows the conductivity of various formulations versus temperature.

The purpose of the present invention is of overcoming the above reported drawbacks which affect the prior art.

In particular, the Applicant has found now, according to the present invention, that the adoption of a particular prepolymer which contains, already included in its molecular structure, the active side ethylene oxide based chains and a large enough number of methacrylic groups, makes it possible the crosslinked polymeric material to be directly obtained by exposure to suitable sources, without using a difunctional comonomer.

The preparation results consequently possible of a solid polymeric electrolyte in membrane form, provided with improved mechanical characteristics, dimensional stability and ionic conductivity, over the corresponding characteristics respectively displayed by the polymeric electrolytes known from the prior art.

In accordance therewith, according to a first aspect thereof, the present invention relates to a solid, polymeric electrolyte in membrane form, constituted by a solid solution of an ionic compound in a crosslinked polyether, characterized in that said polymeric electrolyte is obtained:

(1) by blending:
  (a) a prepolymer having the formula (I)

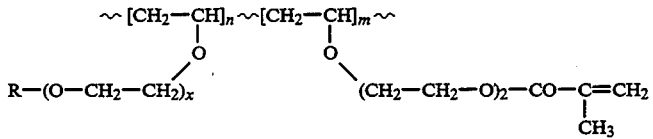

and having a molecular weight comprised within the range of from 10,000 to 100,000, and wherein
R is an ethyl or methyl radical;
x is an integer comprised within the range of from 2 to 5;
n is comprised within the range of from 0.7 to 0.95;
m is comprised within the range of from 0.3 to 0.05 and wherein n+m is 1 in an amount comprised within the range of from 20 to 80% by weight, with (b) an ionic compound, in an amount comprised within the range of from 1 to 30% by weight, in the presence, or less, of (c) a plasticizer selected from an oligomer or a dipolar aprotic solvent, in an amount comprised within the range of from 0 to 80% by weight; and (d) a free-radical-generating activator, in an amount comprised within the range of from 0 to 10% by weight; and, finally, (2) applying the resulting blend the on an inert carrier and exposing said blend to a source of ultraviolet light, thermal radiation or electron beam, until the system is completely crosslinked. The prepolymer (I) can be prepared by means of the cationic polymerization of a vinyl ether of formula:

$$CH_2=CH-O-(CH_2-CH_2-O)_x-R \qquad (II)$$

wherein:
R and x have the above reported meaning, with a vinyloxy ethoxy ethyl methacrylate of formula:

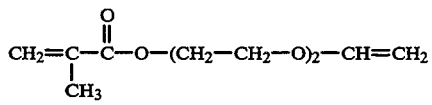

with a molar ratio of both monomers to each other comprised within the range of from 70:30 to 95:5.

The polymerization reaction is carried out in an inert solvent, at a temperature comprised within the approximate range of from −60° C. to −30° C. and in the presence of a Friedel-Crafts catalyst, used in an amount comprised within the range of from 0.5 to 3.0 mol per 100 mol of monomers (II) and (III).

Examples of suitable catalysts for the desired purpose are etherated boron trifluoride, aluminum trichloride, alkyl aluminum halides and tin tetrachloride.

Examples of suitable solvents for the desired purpose are chlorinated solvents, as dichloromethane; and hydrocarbons, as toluene.

At the end of the polymerization, the catalyst is deactivated by adding an aliphatic alcohol, as methanol. The prepolymer is then recovered by means of usual separation techniques, as a colourless, thick liquid having a weight average molecular weight of the order of 10,000–100,000 as a function of the polymerization temperature.

In the preferred embodiment, in formula (I) R represents the methyl radical.

The resulting, prepolymer can be characterized by means of such analytical techniques, as NMR and FT-IR. The results from such analyses confirm the absence of the vinylic double bond, and the presence of the methacrylic double bond, which is present at the same level (5–30% by mol), at which it was initially introduced.

The vinyl ether (II) can be prepared by reacting ethyl vinyl ether with a polyoxyethylene glycol mono-methyl or -ethyl ether. The monomer (III) can be obtained by reacting diethylene glycol monovinyl ether with methacryloyl chloride in ethyl ether and in the presence of pyridine. The monomers (II) and (III) are obtained with a higher than 99% purity, by using usual separation techniques.

The prepolymer (I) is then blended with an ionic compound, in the presence, or less, of a plasticizer and a free radical generating activator, until a homogeneous solution is obtained; the prepolymer is used in amounts comprised within the range of from 20 to 80% by weight, preferably of from 30 to 70% by weight.

Suitable ionic compounds for the purposes of the present invention are salts, preferably perchlorates, borates, fluoroborates, thiocyanates, hexafluoroarsenates, trifluoroacetates and trifluoromethanesulfonates of (monovalent or polyvalent) metals, and, in particular, lithium, sodium, potassium, calcium, copper, zinc, magnesium, lead, tin and aluminum.

Preferred for the purpose according to the invention are lithium salts and, in particular, lithium perchlorate, and in this case it is used in amounts comprised within the range of from 1 to 30% by weight, preferably in amounts of the order of 3–10% by weight.

According a preferred embodiment, a plasticizer is present in the blend, in an amount comprised within the range of from 20 to 80% by weight, preferably of from 30 to 70%.

Suitable plasticizers for the purposes of the present invention can be selected from oligomers containing ethylene oxide chains or aprotic dipolar solvents with high dielectric constant, low volatility and dissociative properties for lithium salts.

Examples of such oligomers are oligoethylene glycol dialkylethers (Diglyme, Tetraglyme) and low-molecular-weight polyethylene glycol dialkylethers (PEGME).

Examples of such solvents are propylene carbonate (PC), ethylene carbonate (EC), dimethoxyethane (DME), and mixtures thereof.

The free radical generating activator (d), which performs the function of speeding up the crosslinking reaction, thus lowering the exposure times, is present in an amount comprised within the range of from 0.5 to 10% by weight, preferably of from 0.1 to 5% by weight.

Suitable free-radical generating activators for the purposes of the present invention are, e.g., benzophenone or benzoin methyl ether.

In the step (2) of the present invention, the resulting homogeneous solution is applied onto a solid carrier which can be a plastic material, glass, or a metal sheet; furthermore, the solution can be directly applied onto the surface of a lithium anode or of a composite cathode generally constituted by an oxide, or a sulfide, of a transition metal (V, Mn, Co, Ni, W, Ti), in mixture with an ionically conductive material and an electronic conductor such as carbon black or acetylene black.

The exposure of the resulting blend to a source of U.V. light, thermal radiation, or electron beam, until the complete crosslinking of the system is obtained, which usually requires a few tens of seconds, leads to obtaining the solid polymeric electrolyte in membrane form with a thickness of the order of 50–200 microns.

The so obtained polymeric electrolyte displays a transition temperature comprised within the range of from −100° C. to −60° C., as a function of the composition of the blend.

The polymeric electrolyte of the present invention is mechanically strong, dimensionally stable, and highly conductive, even at low temperatures. The solid polymeric electrolyte can be used as an electrolytic separator in electrochemical devices, optical displays and sensors.

The following examples are illustrative and non-limitative of the purview of the present invention.

EXAMPLE 1

Preparation of vinyl ether:

To a three-necked flask of 500 ml of capacity, equipped with reflux condenser and kept under a flowing nitrogen stream, ethyl vinyl ether (1.8 mol), triethylene glycol monomethyl ether (0.6 mol) and mercury acetate ($5.7 \cdot 10^{-3}$ mol) are charged.

The reaction mixture is heated up to its reflux temperature and is kept under refluxing conditions for 10 hours.

During this time period, the temperature increases from its initial value of 39° C., up to its end value of 42° C. The reaction is then quenched by means of the addition of solid potassium carbonate, and the reaction mixture is submitted to distillation, firstly under atmospheric pressure, in order to remove any ethyl vinyl ether excess and the ethyl alcohol obtained as a reaction byproduct, and then under reduced pressure (20 torr) in order to separate the title vinyl ether from unreacted glycol monomethyl ether.

The resulting vinyl ether shows a purity higher than 99% and is obtained in a yield, based on the starting triethylene glycol monomethyl ether, of approximately 80%. Its structure is confirmed by NMR and IR spectroscopy and mass spectrometry.

EXAMPLE 2

Preparation of vinyloxy ethoxy ethyl methacrylate

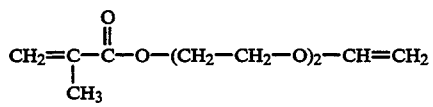

To a three-necked flask of 250 ml of capacity, equipped with reflux condenser, 85 g (0.8 mol) of diethylene glycol, 80 ml (0.8 mol) of ethyl vinyl ether and 4.8 g (15.2 mmol) of mercury acetate $Hg(CH_3-COO)_2$ are charged in the sequence stated.

The reaction mixture is heated up to its refluxing temperature (70°-80° C.) and is kept under refluxing conditions for 10 hours.

The reaction product is recovered by extraction with methylene chloride and is separated from the corresponding divinyl ether by distillation. In that way, 40 g (0.3 mol) of diethylene glycol monovinyl ether (yield 40%) is obtained, which is then added to a solution containing 53 ml of pyridine and 40 ml of ethyl ether. To the resulting mixture, kept at room temperature and under a flowing nitrogen stream, 38.3 g (0.32 mol) is slowly added dropwise of methacryloyl chloride, which causes the immediate precipitation of pyridinium hydrochloride. The reaction is carried out until the monovinyl ether is totally disappeared.

The difunctional product is recovered from the reaction mixture by HPLC, using silica as the stationary phase and, as eluent, a mixture of hexane and ethyl acetate with a volumetric ratio of 8:1 hexane:ethyl acetate. The resulting product displays a higher purity than 99% and its yield, based on the diethylene glycol monovinyl ether used as the starting product, is of approximately 70%.

EXAMPLE 3

Prepolymer preparation

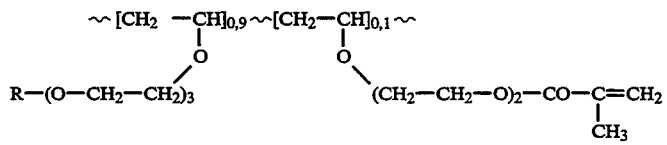

An amount of 4.92 g (25.9 mmol) of monovinyl ether from Example 1 and 0.58 g (2.9 mmol) of vinyloxy ethoxy ethyl methacrylate from Example 2, dissolved in 10 ml of anhydrous methylene chloride are charged to a glass reactor of 100 ml of capacity, equipped with mechanical stirring means of impeller type and inlet fittings for nitrogen and reactant feed. The resulting mixture is cooled down −60° C., then, with vigorous stirring, 0.32 mol of ether-$BF_3$ complex dissolved in 2 ml of methylene chloride is rapidly added.

The reaction is allowed to proceed during 3 hours, with the reaction temperature being kept at −60° C. Then, a methanol excess is added to the reaction mixture, in order to stop the polymerization and remove any hydroxy groups possibly formed during the polymerization reaction. The prepolymer is recovered as a colourless, thick liquid, by extraction with a chlorinated solvent; the yield is quantitative.

The prepolymer is characterized by NMR and FT-IR spectroscopy, which confirm the absence of double bonds of vinylic character and the presence of double bonds of methacrylic character, at the same level (10% by mol) as initially charged.

EXAMPLES 4-8

Preparation of electrolytic membranes

The electrolytic polyether-based membranes are prepared according to the following procedure, carried out inside a dry-box, under an argon atmosphere and with a humidity level lower than 5 ppm, using:
  the prepolymer from Example 3;
  $LiClO_4$ as the ionic compound;
  propylene carbonate (PC) or tertaethylene glycol dimethyl ether (TGME) as plasticizer, in such amounts as reported in following Table:

TABLE 1

| Formulae | Prepolymer mg | Prepolymer %-weight | Plasticizer Type | Plasticizer mg | Plasticizer %-weight | $LiClO_4$ mg | $LiClO_4$ %-weight |
|---|---|---|---|---|---|---|---|
| PVE-MMA1 | 510 | 46.1 | PC | 520 | 47.6 | 70 | 6.3 |
| PVE-MMA2 | 510 | 48.2 | PC | 503 | 47.3 | 47 | 4.4 |
| PVE-MMA3 | 430 | 41.4 | PC | 490 | 47.3 | 118 | 11.3 |
| PVE-MMA4 | 410 | 46.2 | TGME | 420 | 47.4 | 56 | 6.3 |
| PVE-MMA5 | 406 | 47.2 | TGME | 416 | 48.4 | 37 | 4.3 |

The resulting blends are cast into constant-thickness films on glass supports and are submitted to U.V. light exposure for 20 seconds. Thus, 5 homogeneous, clear membranes of approximately 100 microns of thickness are obtained. The glass transition temperatures (Tg), as determined by DSC (differential scanning calorimetry), are reported in following Table 2.

TABLE 2

| | Glass transition temperature (Tg °C.) | | | |
|---|---|---|---|---|
| PVE-MMA1 | PVE-MMA2 | PVE-MMA3 | PVE-MMA4 | PVE-MMA5 |
| −90° C. | −95° C. | −82° C. | −94° C. | −96° C. |

The membrane conductivity measurement is carried out in a cell provided with two symmetrical electrodes of carbon steel, between which said membrane is compressed, by applying a sinusoidal alternating voltage of 100 mV of amplitude.

In Table 3 and in FIG. 1, the values and trends of ionic conductivity are respectively reported, which were obtained by means of impedance spectroscopy measurements at the temperatures of 60° C., 40° C., 20° C., 0° C. and −20° C., within the frequency range of from 0.5 to 65,000 Hertz.

TABLE 3

| Formulations | Conductivity (S/cm) · $10^3$ | | | | |
|---|---|---|---|---|---|
| | 60° C. | 40° C. | 20° C. | 0° C. | −20° C. |
| PVE-MMA1 | 4.30 | 3.10 | 1.80 | 0.94 | 0.27 |
| PVE-MMA2 | 4.20 | 3.10 | 1.90 | 0.64 | 0.21 |
| PVE-MMA3 | 3.80 | 2.70 | 1.70 | 0.93 | 0.28 |
| PVE-MMA4 | 0.67 | 0.61 | 0.45 | 0.028 | 0.01 |
| PVE-MMA5 | 0.50 | 0.42 | 0.27 | 0.12 | 0.042 |

In particular, in FIG. 1, in which on the ordinate the values of conductivity expressed as S/cm, and on the abscissa the values of temperature, expressed as degrees Kelvin, are reported, the lines in the chart have the following meaning:

-- ●-- PVE-MMA1; --|-- PVE-MMA2; --*-- PVE-MMA3; --☐-- PVE-MMA4; --x-- PVE-MMA5.

Figure 2:
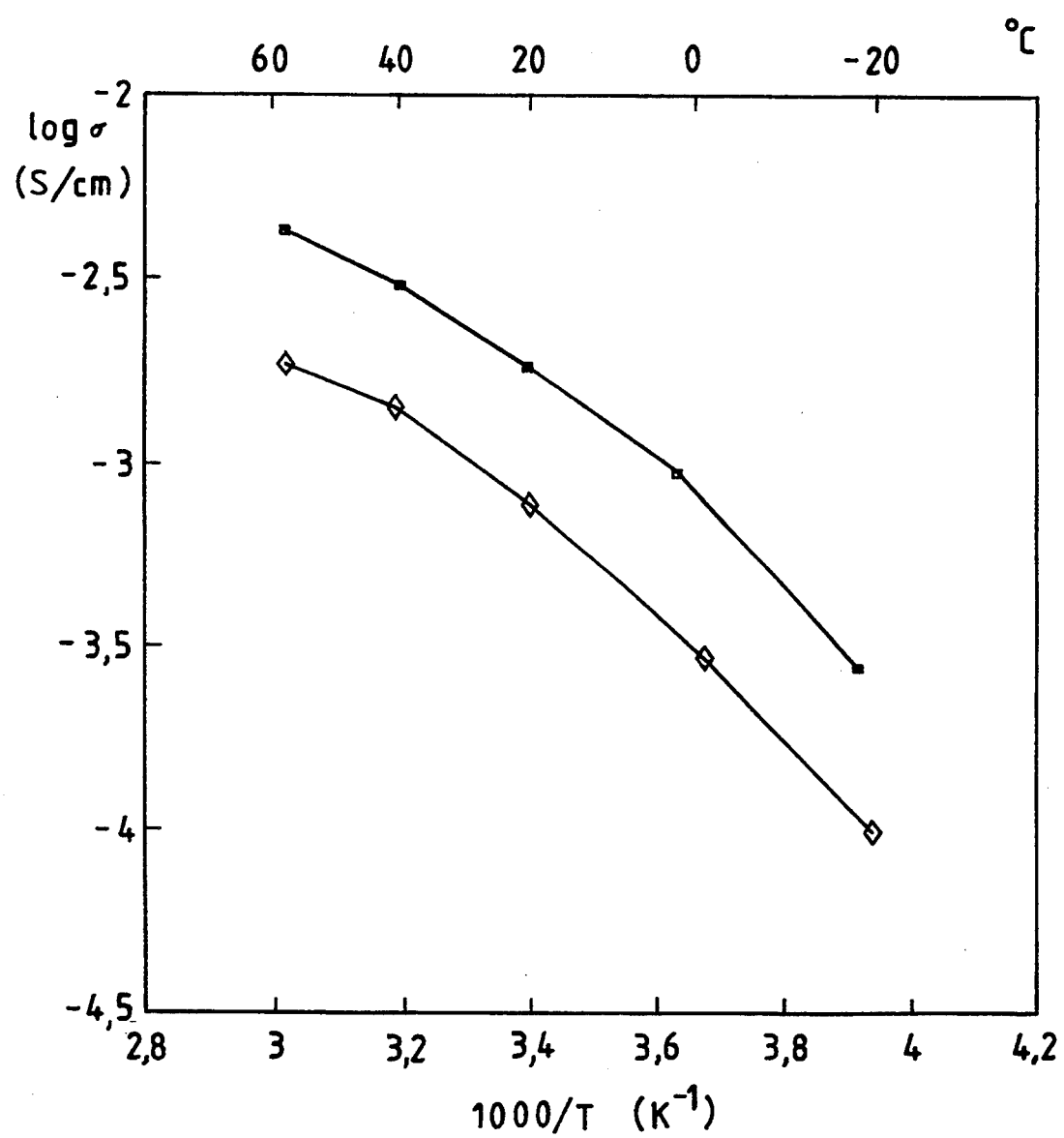
FIG. 2 shows the conductivity versus temperature of the instant formulation and the formulation of Italian Application No. 1008 A/92.

In the chart displayed in FIG. 2, the line (--◆--) relates to the values of conductivity displayed by a membrane (PVE-MMA1) prepared according to the present invention, whereas the line (--◇--) relates to a membrane prepared according to the prior art (Italian patent application No. 1008 A/92).

We claim:

1. Solid, polymeric electrolyte in membrane form, constituted by a solid solution of an ionic compound in a crosslinked polyether, characterized in that said polymeric electrolyte is obtained:
    (1) by blending:
        (a) a prepolymer having a weight average molecular weight within the range of from 10,000 to 100,000 which prepolymer is obtained by copolymerization of a first monomer having the formula $CH_2{=}CH{-}O{-}(CH_2{-}CH_2{-}O)_x{-}R$ wherein:
            R is an ethyl or methyl radical; and
            x is an integer within the range of from 2 to 5;
            with a second monomer having the formula $CH_2{=}C(CH_3){-}CO{-}O{-}(CH_2{-}CH_2{-}O)_2{-}CH{=}CH_2$, the molar ratio of the first monomer with respect to the sum of the first and second monomers being in the range of from 0.7 to 0.95, with
        (b) an ionic compound, in an amount within the range of from 1 to 30% by weight; in the presence of
        (c) a plasticizer selected from the group consisting of an oligomer and a dipolar aprotic solvent, in an amount within the range of from 0 to 80% by weight; and
        (d) a free-radical-generating activator, in an amount within the range of from 0 to 10% by weight; and
    (2) applying the resulting blend from step (1) on an inert carrier and exposing said blend to a source of ultraviolet light, thermal radiation or electron beam, until the blend is completely crosslinked.

2. Solid polymeric electrolyte according to claim 1, in which said prepolymer is present in an amount within the range of from 30 to 70% by weight.

3. Solid polymeric electrolyte according to claim 1, which said ionic compound is in an amount within the range of from 3 to 10% by weight.

4. Solid polymeric electrolyte according to claim 1, in which the ionic compound is selected from the group consisting of perchlorates, borates, fluoroborates, thiocyanates, hexafluoroarsenates, trifluoroacetates and trifluoromethanesulfonates of lithium, sodium, potassium, calcium, copper, zinc, magnesium, lead, tin and aluminum.

5. Solid polymeric electrolyte according to claim 4, in which said ionic compound is a lithium compound.

6. Solid polymeric electrolyte according to claim 5, in which said lithium compound is lithium perchlorate.

7. Solid polymeric electrolyte according to claim 1, in which the plasticizer is in an amount within the range of from 30 to 70% by weight.

8. Solid polymeric electrolyte according to claim 1, in which the plasticizer is an aprotic dipolar solvent selected from the group consisting of propylene carbonate, ethylene carbonate, dimethoxy ethane, and mixtures thereof.

9. Solid polymeric electrolyte according to claim 1, in which the plasticizer is an oligomer selected from the group consisting of oligoethylene glycol dialkyl ethers and polyethylene glycol dialkyl ethers.

10. Solid polymeric electrolyte according to claim 1, in which the free-radical generating activator is contained in amount within the range of from 0.5 to 10% by weight.

11. Solid polymeric electrolyte according to claim 10, in which the amount of the free-radical generating activator is within the range of from 1.0 to 5% by weight.

12. Solid polymeric electrolyte according to claim 1, in which the free-radical generating activator is benzophenone or benzoin methylether.

13. Solid polymeric electrolyte according to claim 1, in which said inert carrier is a film of an inert plastic material, glass, a metal sheet, or the surface of a lithium anode or of a composite cathode constituted by an oxide or a sulfide of a transition metal, in mixture with an ionically conductive material and an electronic conductor.

14. Solid polymeric electrolyte according to claim 1, characterized in that it is in the form of a membrane having a thickness of 50–200 microns.

* * * * *

UNITED STATES PATENT AND TRADEMARK OFFICE
CERTIFICATE OF CORRECTION

PATENT NO. : 5,417,870
DATED : May 23, 1995
INVENTOR(S) : Maria Andrei, Arnaldo Roggero and Massimo Soprani It is certified that error appears in the above-indentified patent and that said Letters Patent is hereby corrected as shown below:

On the Title page, item [54] & Col. 1, line 1, should read--

SOLID, POLYETHER-BASED POLYMERIC ELECTROLYTE --.

Signed and Sealed this

Sixth Day of August, 1996

*Attest:*

BRUCE LEHMAN

*Attesting Officer*    Commissioner of Patents and Trademarks